| United States Patent [19] | [11] Patent Number: 5,031,360 |
| Farnworth et al. | [45] Date of Patent: Jul. 16, 1991 |

[54] BROKEN BLADE DETECTOR FOR SEMICONDUCTOR DIE SAWS

[75] Inventors: Warren M. Farnworth; Ed A. Schrock, both of Boise, Id.

[73] Assignee: Micron Technology, Inc., Boise, Id.

[21] Appl. No.: 542,132

[22] Filed: Jun. 22, 1990

Related U.S. Application Data

[63] Continuation-in-part of Ser. No. 398,722, Aug. 29, 1989, abandoned, which is a continuation-in-part of Ser. No. 278,738, Dec. 2, 1988, abandoned.

[51] Int. Cl.⁵ .............................................. B24B 49/12
[52] U.S. Cl. .......................... 51/134.5 R; 51/165.72; 83/62.1; 83/522.27
[58] Field of Search .................. 83/62, 62.1, 522.27; 51/165.72, 165.87, 134.5 R; 125/13.1; 408/5, 6, 8, 9, 11; 409/134

[56] References Cited

U.S. PATENT DOCUMENTS

| 3,560,826 | 2/1971 | Lonaberger | 51/134.5 X |
| 3,570,189 | 3/1971 | Keding et al. | 51/134.5 |
| 3,835,591 | 9/1974 | Cimprich | 51/106 R |
| 3,912,925 | 10/1975 | Gaskell | 408/6 X |
| 4,340,326 | 7/1982 | Buonauro et al. | 408/16 |
| 4,355,555 | 10/1982 | Kobayashi et al. | 83/62.1 |
| 4,558,686 | 12/1985 | Ono | 125/13 R |
| 4,664,571 | 5/1987 | Takada et al. | 83/62.1 X |
| 4,674,374 | 6/1987 | Sadahiro et al. | 83/62.1 |
| 4,771,665 | 9/1988 | Van Doorn et al. | 83/62.1 |

Primary Examiner—Mark Rosenbaum
Assistant Examiner—Rinaldi Rada
Attorney, Agent, or Firm—Stanley N. Protigal

[57] ABSTRACT

A dicing saw for semiconductors includes a defect detector which is used for stopping operation of the dicing saw when such operation would be adverse to the integrity of the work product (semiconductor dice). Infrared light from a light transducer is transmitted from a light transmitter to a detector at an opposite side of the saw's blade from the transmitter. Infrared light from a light transducer is also reflected from the dicing saw blade edge back to the transducer, permitting detection of reflected light along with the detection of light across the blade.

19 Claims, 2 Drawing Sheets

BROKEN BLADE DETECTOR FOR SEMICONDUCTOR DIE SAWS

CROSS REFERENCE TO RELATED APPLICATIONS

This is a continuation in part of U.S. Pat. Application 398,722, filed Aug. 24, 1989, now abandoned. U.S. patent application 398,722 is a continuation in part of U.S. patent application 278,738, also abandoned.

BACKGROUND OF THE INVENTION

1. Field of the Invention

This invention relates to optical detection of defects in rotary cutting tools. It has particular advantage in association with rotary saws used to cut semiconductor wafers into segments.

2. Prior Art

Dicing saws are used to cut semiconductor wafers into individual dice. Each die is closely adjacent to its neighbors, and the wafer tends to be somewhat brittle. For this reason, it is important that the dicing saw have a blade which is appropriately sharp and having no defects.

The dicing saw is a rotary saw, and typically includes a diamond cutting blade. Because of the physical properties of the work (silicon wafers), defects in the dicing saw blade could cause chipping of the dice or otherwise damage the dice. It is possible that the damage caused by the defective saw could occur on numerous wafers.

A large percentage of the manufacturing costs of producing semiconductor wafers is in the fabrication of functional dice on the wafer. Therefore, it is important to avoid damaging these dice. If preliminary tests of the dice are made prior to cutting, a defect caused by cutting would go undetected until after assembly, resulting in packaging costs being incurred for defective parts. It is, therefore, important that defects in dicing saw blades be detected as soon as they occur.

If defects are automatically detected, then it is possible to shut down the dicing saw automatically, so that the operator may make a visual inspection prior to restarting the saw or deciding what attention the saw requires.

SUMMARY OF THE INVENTION

In accordance with the present invention, infrared light is directed from a light transducer, through an optical alignment block, to a location closely adjacent to the edge of a dicing saw blade. Light is transmitted past the area of the dicing saw blade edge to the transducer and variations in the level of reflected light are detected. In one embodiment, laser light is transmitted by the transducer and is focused against the blade at a location of maximum defect tolerance. In an alternate embodiment, light is transmitted to the blade in an area which includes the blade edge, and variations in the transmitted light are sensed.

The transducer and receiver are positioned so that transmitted light is received whenever a defect exists in the blade which results in an open area or gap at the level of light transmission. This results in an opposing side configuration which is less sensitive to outside effects, like water, slurry and other items in the vicinity. This configuration is not dependent on the specific reflectivity of the blades or the consistency of blade reflectivity, thus reducing requirements for additional setup and adjustments of the detector whenever a blade is installed. The use of the through beam permits various blades to be used, with the only requirement being that the blades be opaque in order for the beam to function properly.

In one embodiment, the transducer also is able to receive light which is reflected from the dicing saw blade edge. Variations in the level of reflected light are detected. This level of reflected light provides additional information which can be used in determining blade condition.

DETAILED DESCRIPTION OF THE PREFERRED EMBODIMENT

Figure 1:
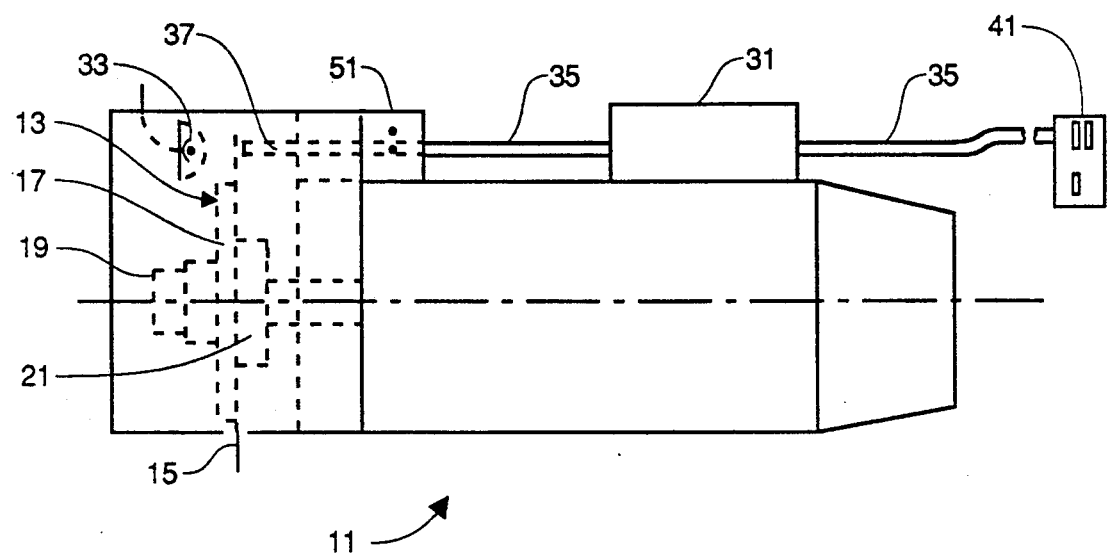
FIG. 1 shows the inventive blade defect detector, as viewed from the direction of the blade edge.
Figure 2:
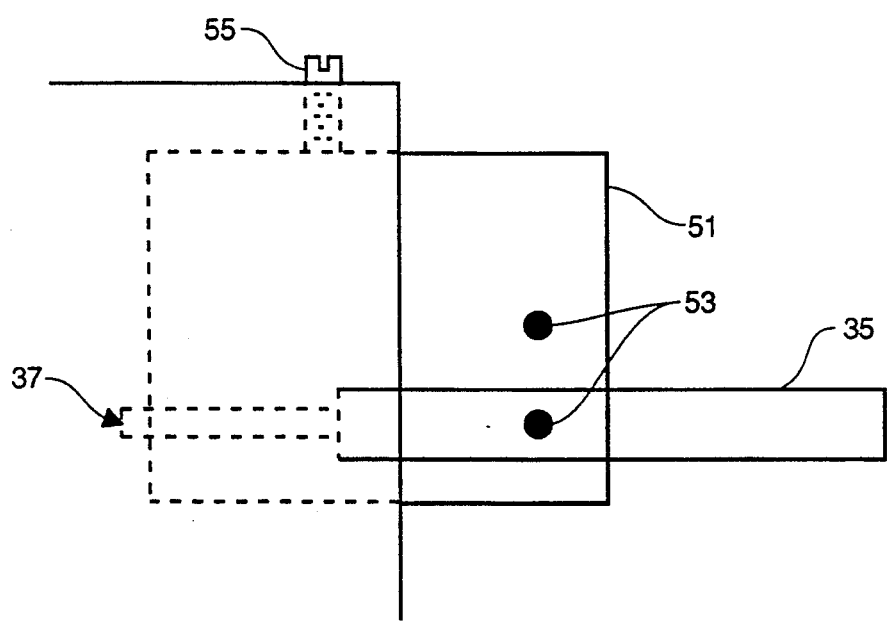
FIG. 2 shows details of the positioning of a light tube used in the invention.

Referring to FIG. 1, a dicing saw 11 includes a diamond cutting blade 13 having an edge 15, formed of diamond grit meshed in nickel, deposited onto an aluminum hub 17. The blade 13 is secured along a shaft by a nut assembly 19 against a blade stop 21. The blade stop 21 fixes the axial position of the blade 13 with respect to the saw 11. Since the blade 13 is cut flat, the axial position of the blade edge 15 is not likely to shift with blade wear, although the saw 11 must be adjusted (by adjusting the height of the chuck) for changes in blade radius.

An optical transducer 31 is mounted to the saw 11. The transducer 31 provides a continuous light output, preferably in the infrared range, in order to reduce the optical effects of silicon dust. The light from the transducer 31 is transmitted through a light tube 35 to a location closely adjacent to the tip of the blade edge 13. In the preferred embodiment, the light tube is provided with an output lens 37 at approximately 0.25 mm from the blade, at approximately 0.25 mm radial distance from the blade edge 15.

An optical sensor 33 is mounted to the saw 11 opposite the saw blade from the transducer 31. In this manner, light from the transducer 31 is transmitted toward the sensor 33, but is blocked in this transmission by a properly configured saw blade edge 15. The transducer 31 provides a continuous light output, preferably in the infrared range, in order to reduce the optical effects of silicon dust. The light from the transducer 31 is transmitted through a light tube 35 to a location closely adjacent to the tip of the blade edge 13. In the preferred embodiment, the light tube is provided with an output lens 37 at approximately 0.25 mm from the blade, at approximately 0.25 mm radial distance from the blade edge 15.

The light is focused to a location which is centered at a predetermined minimum distance from the edge of the blade, which is the 0.25 mm radial distance. The predetermined distance is the maximum distance of an edge deviation if the edge is acceptably free of defects. It turns out that most defects which are that distance from the edge extend circumferentially around the blade by an intolerable distance and can result in surface damage to the semiconductor dice, either by whipsaw effects or by chipping the dice. Partial nicks on the edge which do not reach this distance tend not to damage the dice.

If the transducer 31 transmits laser light, then the position of the light focused on the blade edge 15 is at a distance from the edge 15 which would represent the maximum acceptable deviation of the edge 15. For the purposes of this invention, laser light is considered to be coherent light, whereas light from ordinary non-laser light sources is considered to be non-coherent light.

In the preferred embodiment, the transducer 31 produces non-coherent light, which is at a preferred frequency for transmission through dust and lubricant fog generated by the action of the blade 13. It is possible for non-coherent focused light to be allowed to overlap the edge 15, provided that a substantial amount of light is blocked from the blade 13 when the blade 13 is within specifications. Close tolerances of that sort are not, however, used in the preferred embodiment because it is more important not to require adjustment of the position of the transducer as the blade wears down to its minimum radius. Likewise, since it is necessary to provide appropriate positioning of replacement blades for the proper cutting of wafers, it is not necessary to readjust the position of the detector with a change of the blade.

The light which is transmitted to the blade 13 is transmitted in the direction of the sensor 33. Light transmitted past the blade 13 and variations in this light are thereby detected. Chips in the blade edge 15 will be detected as increased amount of light detected by the sensor 33. It is possible to permit the sensed light to have a predetermined change in output which would represent a permissible degree of wear. The occurrence of chips in the blade would result in a much more rapid increase in transmitted light detected by the sensor 33, coinciding with the rotational speed of the saw 11.

The light which is transmitted to the blade 13 is also reflected back through the light tube 35 to the transducer 31. Variations in the amount of light reflected from the blade 13 may thereby be detected. This provides an additional means to detect flaws in the blade 13. In the case of laser light, chips in the blade edge 15 will be detected as "gaps" or portions of attenuated output in the waveform of reflected light. Similarly, non-coherent light, as reflected from the blade 13, will be modulated by the evenness of the edge 15. It is possible to permit the reflected light to have a predetermined change in output which would represent a permissible degree of wear (and dust covering the lens 37 end of the light tube 35). The occurrence of chips in the blade would result in a much more rapid modulation of the reflected light detected by the transducer 31, coinciding with the rotational speed of the saw 11. Therefore, permissible tolerances for blade wear and blade irregularity can be separately set.

The dicing saw 11 used with the preferred embodiment is controlled by a computer 41, using numerical control of machines techniques. The computer 41 is able to function as register to store valves supplied by the transducer 31 and as a machine controller to control the saw 11. The transducer 31 provides an output signal to a buffer and amplifier which, in turn, provides a signal at a stop switch on the saw 11. The signal at the stop switch causes the computer 41 to stop motion of the saw 11.

Since the blade 13 is not expected to wear beyond the position of the transducer, it is not necessary to adjust the position of the detector during normal operation and the saw 11.

For initial positioning of the light tube 55, an eccentric adjustment block is provided, consisting of a round cylinder 51 with an eccentrically drilled hole. A series of holes 53 on the outside circumference of the round cylinder 51 are used in conjunction with an adjustment rod (not separately shown) in order to permit rotation of cylinder 51 with respect to the diameter of the saw blade 13. Once the desired position of the cylinder 51, and consequently of the light tube 35 is obtained, a locking screw 55 is used to fix the position of the cylinder 51 in order to position the light tube 35. This, in turn, positions the light tube 35 with respect to the blade 13. The blade 13 is then usually inspected and a baseline for acceptable transducer readings is set in the case of a non-coherent light source.

Figure 3:
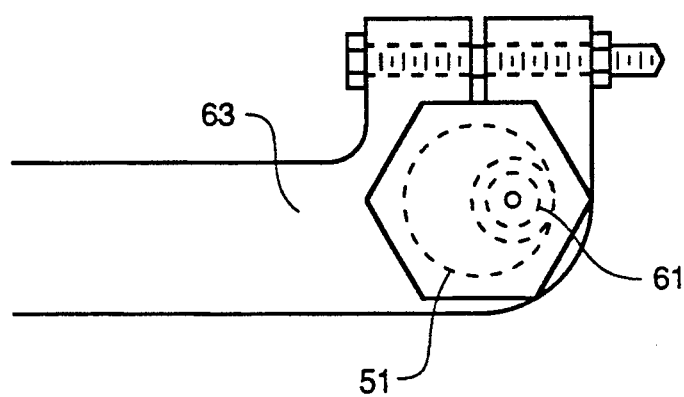
FIG. 3 shows a configuration of an eccentric adjustment mechanism used to position the light tube.
Figure 4:
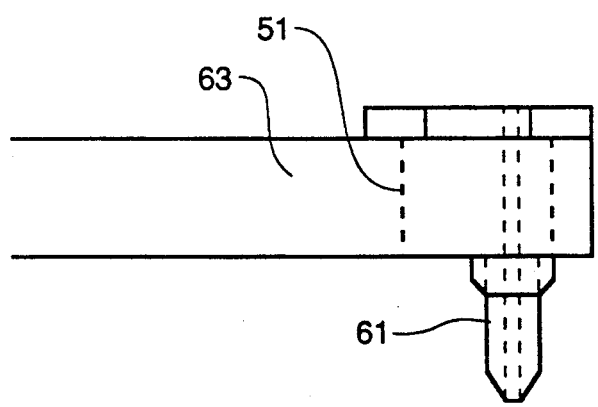
FIG. 4 shows a side view of the eccentric adjustment mechanism.
Figure 5:
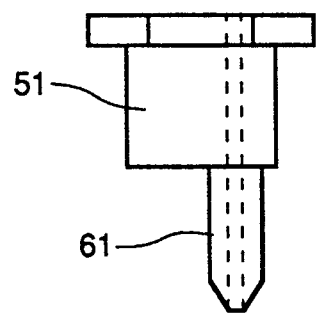
FIG. 5 shows a light tube holder used in the eccentric adjustment mechanism.

FIGS. 3-5 show details of the adjustment block. Rotation of the cylinder 51 causes rotation of a pin portion 61 of the cylinder 51. Since the pin portion 61 is offset from the center of rotation of the cylinder, the pin portion 61 moves orbitally with respect to the center of rotation of the cylinder 51. This movement provides an x and y displacement of the pin portion 61 in relation to a supporting arm 63. The x and y displacement is used to accurately locate the pin portion 61 with respect to an object located under the pin. In this invention, the pin portion 61 houses an end of the light tube 35 with respect to the blade 13.

While the above has been described in terms of specific embodiments, it is anticipated that variations can be made in the configuration of the broken blade detector within the scope of the invention. For this reason, this invention should be read only as limited by the claims.

I claim:

1. Damaged blade detector for a dicing saw which is controlled by an automated machine controller for cutting work by grinding the work by means of a rotary grinding blade comprising:
    (a) a light source;
    (b) a light guide assembly, the light guide assembly guiding light from the light source to the blade of the saw;
    (c) a first detector for detecting light transmitted by said source, said detector positioned adjacent to the saw axially opposite the wave guide assembly for receiving energy transmitted past the saw blade;
    (d) the light guide assembly further receiving reflected light from the blade;
    (e) a second detector detecting levels of said light reflected through the light guide assembly;
    (f) a support for the light guide assembly to adjustably position the light guide assembly with respect to the rotary saw;
    (g) a register to provide an indication of modulation levels of the transmitted light as detected by the first detector beyond a predetermined limit of acceptability; and
    (h) a second register to provide an indication of modulation of the reflected light as detected by the second detector beyond a predetermined limit of acceptability;
    (i) a stop control circuit in the automated machine controller for stopping the operation of the rotary saw in response to said indications of modulation; and (j) the light source being positioned with respect to the saw blade so that normal wear of the saw blade does not require readjustment of the position of the damaged blade detector, including the position of the light guide assembly, but unacceptable damage to the saw blade will be detected by the detectors sensing wear beyond a wear limit of the blade, the wear limit being determined by a distance from an initial blade position which indicates that a normal wear limit is being exceeded and which represents a distance beyond which a defect in the blade's contour would cause a significant increase in damage to the work resulting from the defect.

2. Blade detector as described in claim 1, further comprising:
(a) the support for the wave guide assembly including a positioner, the positioner having adjustment means capable of radially adjusting the position of the wave guide assembly with respect to the axis of rotation of the saw blade;
(b) the wave guide assembly having an end adapted to be mounted to the positioner.

3. Blade detector as described in claim 1, further comprising:
the first and second detectors being positioned at a wear limit of the blade.

4. Blade detector as described in claim 3, further comprising:
the light guide assembly being positioned so as not to require repositioning of the light guide assembly with subsequent changes of the saw blade.

5. Blade detector as described in claim 1, further comprising:
the light guide assembly including a single optical waveguide for guiding light from the light source to the blade of the saw and for receiving reflective light from the blade of the saw.

6. Blade detector as described in claim 5, further comprising:
the light source providing non-coherent light of a frequency optimized to maximize reflection from a nickel-diamond saw blade.

7. Blade detector as described in claim 5, further comprising:
the light source being a coherent light source.

8. Blade detector as described in claim 5, further comprising:
the first and second detectors being positioned at a wear limit of the blade.

9. Damaged blade detector for a rotary saw, in which the rotary saw is controlled by an automated machine controller for cutting work comprising:
(a) a source of electromagnetic energy;
(b) a wave guide assembly, the wave guide assembly guiding electromagnetic energy from the source to the blade of the saw;
(c) a first detector for detecting electromagnetic energy generated by said source, said detector positioned adjacent to the saw axially opposite the wave guide assembly for receiving energy transmitted past the saw blade;
(d) a support for the wave guide assembly to adjustably position the wave guide assembly with respect to the rotary saw;
(e) a first register to provide an indication of modulation levels of the transmitted energy as detected by said detector beyond a predetermined limit of acceptability;
(f) a stop control circuit in the automated machine controller for stopping the operation of the rotary saw in response to the indication from said register of modulation to a level beyond a predetermined limit of acceptability;
(g) a second detector for detecting electromagnetic energy receiving portions of said energy which are reflected from the saw blade and received through the wave guide assembly;
(h) a second register to provide an indication of modulation of the reflected energy, as detected by the second detector, beyond a predetermined limit of acceptability; and
(i) the stop control circuit stopping the operation of the rotary saw in response to the indication of modulation of the reflected energy beyond a predetermined limit of acceptability.

10. Blade detector as described in claim 9, further comprising:
(a) the source of electromagnetic energy being a light source;
(b) the first detector detecting levels of light transmitted past the saw blade;
(c) the wave guide assembly receiving reflective light from the saw blade; and
(d) the second detector detecting levels of light reflected from the saw blade through the light guide assembly and the second register providing an indication of modulation of the reflected light as detected by the second detector.

11. Blade detector as described in claim 10, further comprising:
the wave guide assembly including a single optical waveguide for guiding light from the light source to the blade of the saw and for receiving reflective light from the blade of the saw.

12. Blade detector as described in claim 11, further comprising:
the light source providing non-coherent light of a frequency optimized to maximize reflection from a nickel-diamond saw blade.

13. Blade detector as described in claim 11, further comprising:
the light source being a coherent light source.

14. Blade detector as described in claim 9, further comprising:
(a) the support for the wave guide assembly including a positioner, the positioner having adjustment means capable of radially adjusting the position of the wave guide assembly with respect to the axis of rotation of the saw blade;
(b) the wave guide assembly having an end adapted to be mounted to the positioner.

15. Blade detector as described in claim 13, further comprising:
the energy source being positioned with respect to the saw blade so that normal wear of the saw blade does not require readjustment of the position of the damaged blade detector, including the position of the wave guide assembly, but unacceptable damage to the saw blade will be detected by the damaged blade detector.

16. Blade detector as described in claim 9, further comprising:
the damaged blade detector being positioned at a wear limit of the blade.

17. Blade detector as described in claim 13, further comprising:

the wave guide assembly being positioned so as not to require repositioning of the wave guide assembly with subsequent changes of the saw blade.

18. Blade detector as described in claim 17, further comprising:
the damaged blade detector being positioned at a wear limit of the blade.

19. Blade detector as described in claim 9, further comprising:
the first and second detectors being positioned at a wear limit of the blade, the wear limit determined by a distance from an initial blade position which indicates that a normal wear limit is being exceeded and which represents a distance beyond which a defect in the blade's contour would cause a significant increase in damaged to the work resulting from the defect.

* * * * *

UNITED STATES PATENT AND TRADEMARK OFFICE
CERTIFICATE OF CORRECTION

PATENT NO. : 5,031,360
DATED : July 16, 1991
INVENTOR(S) : Warren M. Farnworth et al It is certified that error appears in the above-indentified patent and that said Letters Patent is hereby corrected as shown below:

Column 3, line 60, delete "valves" and insert -- values --.

Column 8, line 7, delete "damaged" and insert -- damage --.

Signed and Sealed this

Seventh Day of December, 1993

Attest:

BRUCE LEHMAN

*Attesting Officer*  *Commissioner of Patents and Trademarks*